3,032,504
HYDRAULIC BRAKE FLUID
George L. Doelling, St. Louis, and Joseph A. Siefker, Webster Groves, Mo., assignors to Wagner Electric Corporation, St. Louis, Mo., a corporation of Delaware
No Drawing. Filed May 27, 1960, Ser. No. 32,076
10 Claims. (Cl. 252—79)

This invention relates to hydraulic fluids and, more particularly, to hydraulic brake fluids usable at extremely low temperatures, as well as at temperatures usually encountered in the operation of automobiles, buses and military vehicles.

The principal object of this invention is to provide suitable fluids for actuating hydraulic brakes and other pressure systems on automobiles, trucks, buses, military vehicles and wherever hydraulic brakes are used, including so-called industrial brakes, such as crane brakes.

Another object of this invention is to provide hydraulic brake fluids of the so-called heavy-duty type, which will operate satisfactorily even under severe conditions of operation. Another object of this invention is to provide an economical brake fluid which will operate under severe winter conditions as well as in summer weather in mild climates, and to provide a brake fluid with ample lubricating value under all conditions encountered in vehicle operation.

These and other objects and advantages will become apparent hereinafter.

The present invention comprises hydraulic fluids having a minor portion of an acetal incorporated therein.

This invention further comprises hydraulic brake fluids having ingredients and combinations of ingredients, the proportions thereof, and features of composition and synthesis, which will be hereinafter described and claimed.

The generally accepted requirements of a heavy-duty brake fluid are as follows:

The fluid must be high enough in boiling point so that it will not form vapor in the system due to boiling of some of its ingredients. It must not congeal or freeze at extreme winter temperatures. It must not have a deteriorating effect on the metal and rubber parts of the brake system. It must have sufficient lubricating value to prevent excessive wear on the moving parts of the system. It must be stable to heat, and it must have a certain amount of water tolerance and miscibility with other fluids. Also, its viscosity should be low enough to be operative at low temperatures, and high enough to operate satisfactorily at high temperatures.

One of the difficulties with present fluids is, if sufficient lubricant element is used, then the viscosity of the fluid at low temperatures is too high for the fluid to operate well. Also, practically all brake fluid specifications now require that at least 20% by weight of non-volatile or lubricant element be present in the fluid, and the viscosity at $-40°$ F. must be not over 1800 centistokes. At the same time, the viscosity at 130° F. must be at least 4.0 centistokes, or preferably slightly higher.

These rather difficult requirements are met in the brake fluid of this invention by adding an adequate amount of lubricant element to satisfy the requirements at high temperature, and then adding a minor proportion of a viscosity-reducing agent to keep the viscosity at $-40°$ F., or lower temperatures, low enough so that the fluid is operative even at these low temperatures.

The brake fluid of this invention contains as the lubricant element a ricinoleate ester of a glycol, and as the diluent element at least one of the group consisting of the lower mono-alkyl ethers of diethylene glycol, 3-methoxy butanol, and amyl and hexylalcohols, and as the viscosity-reducing agent an acetal which reduces viscosity at low temperatures, together with a minor amount of a glycol such as propylene glycol, hexylene glycol and 1,3-butylene glycol. Also small but effective amounts of antioxidant and corrosion inhibitors may be added. Our preferred composition comprises from 5% to 30% by volume of a ricinoleate of a glycol, said glycol having not over six carbon atoms per molecule, from 40% to 70% by volume of at least one diluent chosen from the group consisting of the amyl alcohols, the hexyl alcohols, the lower mono-alkyl ($C_1$ to $C_4$) ethers of diethylene glycol and 3-methoxybutanol, from 5% to 30% by volume of at least one glycol chosen from the group consisting of propylene glycol, butylene glycol and hexylene glycol, from 1% to 10% by volume of an acetal or a mixture of acetals having the formula $$R_1\overset{\displaystyle OR_2}{\underset{\displaystyle OR_3}{CH}}$$

wherein $R_1$ is hydrogen or an alkyl group having not over 5 carbon atoms, and $R_2$ and $R_3$ are alkyl groups having not over 6 carbon atoms per molecule, together with a corrosion inhibitor and an antioxidant, if desired. In the choice of diluents we prefer to use not over a total of about 35% of the amyl alcohol and hexyl alcohol combined. In the lubricant element from 5 to 20% by volume of a polypropylene glycol, having a molecular weight from 1000 to 3000, and preferably a molecular weight of about 2000, can be used in addition to the ricinoleate ester lubricant. The ricinoleate of a glycol is intended to include ricinoleates of di-glycols and tri-glycols such as diethylene glycol, dipropylene glycol and triethylene glycol. In every case, the total lubricant should be at least 20 percent of the brake fluid.

In the diluent element of the fluid, when monoethyl ether of diethylene glycol is used, the pure or so-called "low-gravity" grade should be used because the regular or commercial grade usually contains about 25% to 30% of ethylene glycol, which is not desirable in this composition. The low gravity monoethyl ether of diethylene glycol contains not more than approximately 3% ethylene glycol, by volume. The amyl alcohol can preferably be primary normal amyl alcohol, 2-methyl butanol-1 or isoamyl alcohol. The hexyl alcohol preferably is 2-methyl pentanol-1, methyl isobutyl carbinol, 2-ethyl butyl alcohol, 2,3-dimethyl butanol-1 or hexanol-2.

The acetal used in brake fluid of this invention has the function chiefly of reducing the viscosity of the brake fluid at low temperatures while still retaining a relatively high viscosity at room temperature and at elevated temperatures. Acetals of the type claimed which can be used singularly or in combination are listed in the following table:

|  | Viscosity, Centistokes at 20° C. | Specific Gravity at 20°/20° C. | Boiling Point at 760 mm., ° C. |
|---|---|---|---|
| Acetals: |  |  |  |
| Di-n-propoxy methane | 0.868 | .8352 | 136.5 to 138.5 |
| Di-n-butoxy methane | 1.27 | .8386 | 180 to 182 |
| Di-isobutoxy methane | 1.22 | .8264 | 162 to 163.5 |
| 1,1-Diethoxy n-butane | 0.81 | .8295 | 142 to 145 |
| 1,1-Diethoxy isobutane | 0.79 | .8241 | 133 to 136 |
| 1,1-Diethoxy-n-propane | 0.66 | .8288 | 124 |
| Diluents: |  |  |  |
| Methyl Isobutyl Carbinol | 6.31 | .8079 | 131.6 |
| 2-methyl-1-Pentanol | 7.36 | .8252 | 148 |
| Monoethyl ether of diethylene glycol | 4.50 | .9898 | 201.9 |

As compared to many of the diluents used in brake fluids, acetals of the type used in fluids of this invention have very low viscosity at 20° C., as shown in the table above, and they also have very low viscosity at $-40°$ F. It is preferable to use acetals which conform to the formula:

wherein $R_1$ is hydrogen or an alkyl group having not over 5 carbon atoms, and $R_2$ and $R_3$ are alkyl groups each having not over 6 carbon atoms.

Corrosion inhibitors and antioxidants can be advantageously added to the brake fluid of this invention, to minimize attack on the metal parts of the system. As corrosion inhibitors, from 0.1% to 3.0% of sodium or potassium ricinoleate or oleate, borax, alkali metal nitrites and certain amines, among others, can be used. As antioxidants, from 0.05% to 1.0% of diphenylolpropane, hydroquinone, tertiary-butyl catechol, 2,6-di-tertiary butyl-4-methyl phenol, and others, can be used.

The proportions of the ingredients used in the present composition are critical, and the proportions claimed are chosen because all of the numerous requirements of a commercially practicable brake fluid will not be satisfactorily met unless these proportions are used.

The following examples serve to illustrate the invention. In each of the following examples, the ingredients given produce approximately 100 cc. of fluid.

*Examples Nos. 1 and 1-A*

|  | No. 1 | No. 1-A |
|---|---|---|
| Propylene glycol mono-ricinoleate cc | 25.0 | 25.0 |
| Propylene glycol cc | 13.5 | 13.5 |
| Diethylene glycol mono-Ethyl ether cc | 60.0 | 52.0 |
| Potassium ricinoleate grams | 1.7 | 1.7 |
| AgeRite Resin D (Antioxidant) do | 0.1 | 0.1 |
| 1,1-Diethoxy-n-butane cc | None | 8.0 |
| Tests on these fluids: |  |  |
| Specific Gravity at 20°/20° C | .9950 | .9827 |
| pH, SAE | 8.78 | 8.65 |
| Boiling point, SAE °F | 379 | 355 |
| Flash point, Cleveland °F | 225 | 165 |
| Viscosity at 130° F cs | 5.10 | 4.61 |
| Viscosity at −40° F cs | 3,210 | 1,650 |
| Cold Test, 6 days at −40° F | Fluid | Fluid |

The viscosity of −40° F. of fluid of Example No. 1 with no acetal in it, is 3210 centistokes which is far over the 1800 centistoke maximum of most brake fluid specifications today. In Fluid No. 1-A, with 8% of acetal in it, the viscosity at −40° F. is within the specification limit.

*Examples Nos. 2 and 2-A*

|  | No. 2 | No. 2-A |
|---|---|---|
| Composition: |  |  |
| Propylene glycol mono-ricinoleate cc | 16.7 | 16.7 |
| Propylene glycol cc | 5.5 | 5.5 |
| Hexylene blycol cc | 21.3 | 21.3 |
| 2-Methyl butanol-1 cc | 7.0 | 5.7 |
| 2-Methyl pentanol-1 cc | 14.0 | 11.3 |
| Poly propylene glycol (mol. wt. =2,000) cc | 5.1 | 5.1 |
| Diethylene glycol mono ethyl ether cc | 29.0 | 29.0 |
| Diphenylol propane grams | 0.3 | 0.3 |
| Potassium ricinoleate do | 1.0 | 1.0 |
| Di-n-propoxy methane cc | None | 4.0 |
| Tests on these fluids: |  |  |
| Specific gravity at 20°/20°C | .9436 | .9446 |
| pH, SAE | 8.60 | 8.55 |
| Boiling point, SAE °F | 338 | 335 |
| Flash point, Cleveland °F | 180 | 165 |
| Viscosity at 130° F cs | 5.85 | 5.46 |
| Viscosity at −40° F cs | 1,630 | 1,265 |
| Cold Test, 6 days at −40° F | Fluid | Fluid |

While the viscosity at −40° F. on Example No. 2 is 1630 centistokes which is passable but fairly close to the 1800 centistokes specification limit, the viscosity at −40° F. is 1265 centistokes on Example No. 2-A which is easily within the limit, and a more desirable viscosity than on Example No. 2. The addition of only 4% by volume of an acetal has achieved this result. At the same time, the viscosity at 130° F. is still 5.46 centistokes on Example No. 2-A which is much above the 4.0 centistoke SAE specification minimum, which is a desirable result.

The SAE corrosion test was run on Example No. 2-A fluid in the usual manner, with six metal strips, for 5 days at 210° F. The results were as follows:

|  | Loss in weight, mg. per sq. cm. |
|---|---|
| Tinned iron | −.01 |
| Steel | −.135 |
| Aluminum | None |
| Cast iron | −.03 |
| Brass | −.05 |
| Copper | −.03 |
| ph (after test) | 7.41 |

This test easily meets the requirements of this SAE 70R1 specification corrosion test.

From the above and other tests this Example No. 2-A fluid is an operable brake fluid.

*Example No. 2-B*

This brake fluid has the same composition as Example No. 2-A except that only 2 cc. of di-n-propoxy methane was used, and about 12.7 cc. of 2-methyl pentanol-1 and about 6.3 cc. of 2-methyl butanol-1 were used.

This fluid had a viscosity at −40° F. of 1460 centistokes, which is still easily passable, under the 1800 centistoke limit, and is an operable brake fluid.

*Example No. 2-C*

This brake fluid has the same composition as Example No. 2-A except that only 1% by volume of di-n-propoxy methane was used, and correspondingly more of the alcohol diluents was used. This fluid has a viscosity at −40° F. of about 1600 centistokes, indicating that the use of less than 1% by volume of acetal is of little value in controlling low temperature viscosity of brake fluids.

*Examples Nos. 3 and 3-A*

|  | No. 3 | No. 3-A |
|---|---|---|
| Composition: |  |  |
| Propylene glycol mono-ricinoleate cc | 16.70 | 16.70 |
| Propylene glycol cc | 5.50 | 5.50 |
| Hexylene glycol cc | 21.30 | 21.30 |
| Poly propylene glycol (mol wt-2,000) cc | 8.27 | 8.27 |
| Diethylene glycol monoethyl ether cc | 46.85 | 40.85 |
| Di phenylol propane grams | 0.3 | 0.3 |
| Potassium ricinoleate do | 1.0 | 1.0 |
| Di-n-butoxy methane cc | None | 6.00 |
| Tests on these fluids: |  |  |
| Specific gravity at 20°/20° C | .9799 | .9709 |
| pH, SAE | 8.95 | 9.00 |
| Boiling point, SAE °F | 383.4 | 386 |
| Flash point, Cleveland °F | 220 | 195 |
| Viscosity at 130° F cs | 6.36 | 6.01 |
| Viscosity at −40° F cs | 2,210 | 1,675 |
| Cold Test, 6 days at −40° F | Fluid | Fluid |

The fluid of Example No. 3 has a viscosity at −40° F. of 2210 centistokes which is over the 1800 centistokes allowable in present-day brake fluid specifications. But when 6% by volume of an acetal is used in place of 6% of the diluent element, the viscosity is lowered to a passable value of 1675 centistokes. Both of these fluids are relatively low in diluent and correspondingly high in lubricant. Fluids of this type have superior lubricating value, as has been shown by stroking tests and by actual use in a number of automotive brake systems. The fluids described herein meet the rigid requirements of the Society of Automotive Engineers Specification No. 70R1 for heavy-duty brake fluids.

The acetal additive tends to increase the rubber swelling characteristic of the fluid, but all fluids illustrated herein have a rubber swelling characteristic well within the 0.050 inch limit set by the SAE specification for heavy-duty brake fluids.

Example No. 4

Composition: No. 4
- 1,3-butylene glycol mono-ricinoleate ____ cc__ 22.8
- 1,3-butylene glycol _____ cc__ 14.5
- 3-methoxy butanol _____ cc__ 58.25
- 1,1-diethoxy isobutane _____ cc__ 1.5
- Diethoxy n-butane _____ cc__ 1.5
- Potassium ricinoleate _____ grams__ 1.25
- AgeRite Resin D _____ do____ 0.1
- Solution of salt of amino imidazoline____ cc__ 0.1

Tests on this fluid:
- Specific gravity at 20°/20° C_____ .9466
- pH, SAE_____ 9.00
- Boiling point, SAE_____ °F__ 329.8
- Flash point, Cleveland_____ °F__ 160
- Viscosity at 130° F_____ cs__ 4.97
- Viscosity at −40° F_____ cs__ 1245
- Cold test, 6 days at −40° F_____ Fluid The SAE corosion test run on the fluid of Example No. 4 in the usual manner, gave results as follows:

| | Loss in weight, mg. per sq. cm. |
|---|---|
| Tinned iron | 0 |
| Steel | −.09 |
| Aluminum | 0 |
| Cast iron | +.056 |
| Brass | −.046 |
| Copper | −.014 |
| pH (after test) | 7.70 |

This test easily passes the requirements of the SAE 70R1 specification corrosion test.

This invention is intended to cover all changes and modifications of the examples of the invention herein chosen for purposes of the disclosure, which do not constitute departures from the spirit and scope of the invention.

What is claimed is:

1. A heavy-duty hydraulic brake fluid consisting essentially of, per 100 parts by volume, 1 to 10 parts by volume of at least one acetal having the formula:

in which $R_1$ is selected from the class consisting of hydrogen and alkyl groups having not over 5 carbon atoms, and $R_2$ and $R_3$ are alkyl groups each having not over 6 carbon atoms, from 40 to 70 parts by volume of at least one diluent chosen from the group consisting of the amyl alcohols, the hexyl alcohols, the lower mono-alkyl ethers of diethylene glycol and 3-methoxy butanol, from 5 to 30 parts by volume of at least one glycol chosen from the group consisting of propylene glycol, butylene glycol and hexylene glycol and from 5 to 30 parts by volume of a ricinoleate of a glycol, said glycol being an aliphatic glycol having not over 6 carbon atoms per molecule.

2. The hydraulic brake fluid of claim 1, wherein said fluid is provided with small but effective amounts of antioxidant and corrosion inhibitor.

3. A heavy-duty hydraulic brake fluid consisting essentially of, per 100 parts by volume, 1 to 10 parts by volume of at least one acetal having the formula

in which $R_1$ is selected from the class consisting of hydrogen and alkyl groups having not over 5 carbon atoms, and $R_2$ and $R_3$ are alkyl groups each having not over 6 carbon atoms, from 40 to 70 parts by volume of at least one diluent chosen from the group consisting of the amyl alcohols, the hexyl alcohols, the lower monoalkyl ethers of diethylene glycol and 3-methoxy butanol, from 5 to 30 parts by volume of at least one glycol chosen from the group consisting of propylene glycol, butylene glycol and hexylene glycol, and from 5 to 30 parts by volume of propylene glycol mono-ricinoleate.

4. A heavy-duty hydraulic brake fluid consisting essentially of, per 100 parts by volume, 1 to 10 parts by volume of at least one acetal having the formula:

in which $R_1$ is selected from the class consisting of hydrogen and alkyl groups having not over 5 carbon atoms, and $R_2$ and $R_3$ are alkyl groups each having not over 6 carbon atoms, from 40 to 70 parts by volume of diethylene glycol mono-ethyl ether, from 5 to 30 parts by volume of at least one glycol chosen from the group consisting of propylene glycol, butylene glycol and hexylene glycol, and from 5 to 30 parts by volume of a ricinoleate of a glycol, said glycol being an aliphatic glycol having not over 6 carbon atoms per molecule, said brake fluid having a viscosity of less than about 1800 centistokes at −40° F.

5. A heavy-duty hydraulic brake fluid consisting essentially of, per 100 parts by volume, 1 to 10 parts by volume of at least one acetal having the formula:

in which $R_1$ is selected from the class consisting of hydrogen and alkyl groups having not over 5 carbon atoms, and $R_2$ and $R_3$ are alkyl groups each having not over 6 carbon atoms, from 40 to 70 parts by volume of at least one diluent chosen from the group consisting of the amyl alcohols, the hexyl alcohols, the lower mono-alkyl ethers of diethylene glycol and 3-methoxy butanol, from 5 to 30 parts by volume of at least one glycol chosen from the group consisting of propylene glycol, butylene glycol and hexylene glycol, from 5 to 20 parts by volume of polyhexylene glycol, from 5 to 20 parts by volume of polypropylene glycol having an average molecular weight between 1000 and 3000 and from 5 to 30 parts by volume of a ricinoleate of a glycol, said glycol being an aliphatic glycol having not over 6 carbon atoms per molecule, said brake fluid having a viscosity of less than about 1800 centistokes at −40° F.

6. The hydraulic brake fluid of claim 5, wherein said fluid is provided with small but effective amounts of antioxidant and corrosion inhibitor.

7. A heavy-duty hydraulic brake fluid consisting essentially of, per 100 parts by volume, 1 to 10 parts by volume of at least one acetal having the formula:

in which $R_1$ is selected from the class consisting of hydrogen and alkyl groups having not over 5 carbon atoms, and $R_2$ and $R_3$ are alkyl groups each having not over 6 carbon atoms, from 40 to 70 parts by volume of at least one diluent chosen from the group consisting of the amyl alcohols, the hexyl alcohols, the lower mono-alkyl ethers of diethylene glycol and 3-methoxy butanol, from 5 to 30 parts by volume of at least one glycol chosen from the group consisting of propylene glycol, butylene glycol and hexylene glycol, from 5 to 20 parts by volume of polypropylene glycol having an average molecular weight between 1000 and 3000 and from 5 to 30 parts by volume of a ricinoleate of a glycol, said glycol being an aliphatic glycol having not over 6 carbon atoms per molecule, said polypropylene glycol plus said ricinoleate of a glycol forming a total of at least approximately 20% of the fluid, said brake fluid having a viscosity of less than about 1800 centistokes at −40° F.

8. A heavy-duty brake fluid consisting essentially of, per 100 parts by volume, 1 to 10 parts by volume of at least one acetal having the formula:

$$\begin{array}{c} OR_2 \\ R_1CH \\ OR_3 \end{array}$$

in which $R_1$ is selected from the class consisting of hydrogen and alkyl groups having not over 5 carbon atoms, and $R_2$ and $R_3$ are alkyl groups each having not over 6 carbon atoms, approximately 30 parts by volume of diethylene glycol mono-ethyl ether, approximately 13 parts by volume of 2-methyl pentanol-1, approximately 7 parts by volume of 2-methyl butanol-1, from 5 to 30 parts by volume of at least one glycol chosen from the group consisting of propylene glycol, butylene glycol and hexylene glycol, from 5 to 20 parts by volume of polypropylene glycol having an average molecular weight between 1000 and 3000 and from 5 to 30 parts by volume of a ricinoleate of a glycol, said glycol being an aliphatic glycol having not over 6 carbon atoms per molecule, said polypropylene glycol plus said ricinoleate of a glycol forming a total of at least approximately 20% of the brake fluid, said brake fluid having a viscosity of less than about 1800 centistokes at —40° F.

9. The hydraulic brake fluid of claim 7, wherein said fluid is provided with small but effective amounts of antioxidant and corrosion inhibitor.

10. A heavy-duty hydraulic brake fluid consisting essentially of, per 100 parts by volume, approximately 2 parts by volume of at least one acetal having the formula:

$$\begin{array}{c} OR_2 \\ R_1CH \\ OR_3 \end{array}$$

in which $R_1$ is selected from the class consisting of hydrogen and alkyl groups having not over 5 carbon atoms, and $R_2$ and $R_3$, are alkyl groups each having not over 6 carbon atoms, approximately 30 parts by volume diethylene glycol mono-ethyl ether, approximately 13 parts by volume 2-methyl pentanol-1, approximately 6 parts by volume 2-methyl butanol-1, approximately 17 parts by volume propylene glycol mono-ricinoleate, approximately 6 parts by volume propylene glycol, approximately 20 parts by volume hexylene glycol, approximately 5 parts by volume polypropylene glycol having a molecular weight of about 2000, and small but effective amounts of corrosion inhibitor and antioxidant, said brake fluid having a viscosity of less than about 1800 centistokes at —40° F.

References Cited in the file of this patent
UNITED STATES PATENTS

| | | |
|---|---|---|
| 2,382,931 | Woodhouse et al. | Aug. 14, 1945 |
| 2,507,401 | Doelling | May 9, 1950 |
| 2,512,771 | Glavis et al. | June 27, 1950 |
| 2,803,605 | Doelling et al. | Aug. 20, 1957 |
| 2,921,906 | Doelling et al. | Jan. 19, 1960 |

FOREIGN PATENTS

| | | |
|---|---|---|
| 652,652 | Great Britain | Apr. 25, 1951 |